United States Patent
Zhao et al.

(10) Patent No.: US 12,301,828 B2
(45) Date of Patent: May 13, 2025

(54) IMAGE COMPRESSION METHOD, APPARATUS, AND COMPUTER-READABLE STORAGE MEDIUM

(71) Applicants: Haining ESWIN Computing Technology Co., Ltd., Jiaxing (CN); Beijing ESWIN Computing Technology Co., Ltd., Beijing (CN)

(72) Inventors: Bo Zhao, Zhejiang (CN); Duoduo Zhang, Zhejiang (CN); Benchuan Hu, Zhejiang (CN); Huawen Ding, Zhejiang (CN)

(73) Assignees: HAINING ESWIN COMPUTING TECHNOLOGY CO., LTD., Haining (CN); BEIJING ESWIN COMPUTING TECHNOLOGY CO., LTD, Beijing (CN)

( * ) Notice: Subject to any disclaimer, the term of this patent is extended or adjusted under 35 U.S.C. 154(b) by 214 days.

(21) Appl. No.: 18/147,266

(22) Filed: Dec. 28, 2022

(65) Prior Publication Data
US 2023/0232013 A1 Jul. 20, 2023

(51) Int. Cl.
*H04N 19/14* (2014.01)
*H04N 19/119* (2014.01)
(Continued)

(52) U.S. Cl.
CPC .......... *H04N 19/14* (2014.11); *H04N 19/119* (2014.11); *H04N 19/126* (2014.11); *H04N 19/176* (2014.11); *H04N 19/186* (2014.11)

(58) Field of Classification Search
CPC ..................................................... H04N 19/00
See application file for complete search history.

(56) References Cited

U.S. PATENT DOCUMENTS

2008/0152221 A1 6/2008 Kadatch
2015/0189302 A1 7/2015 Pu et al.
(Continued)

FOREIGN PATENT DOCUMENTS

CN 102186070 A 9/2011
CN 106068648 A 11/2016
(Continued)

OTHER PUBLICATIONS

Search Report dated Nov. 12, 2023 from the Office Action for Chinese Application No. 202210051253.6 issued Nov. 16, 2023, 3 pages. [See p. 1-2, categorizing the cited references].
(Continued)

*Primary Examiner* — Kyle M Lotfi
(74) *Attorney, Agent, or Firm* — Ladas & Parry, LLP

(57) ABSTRACT

Embodiments of the present disclosure provide an image compression method, an apparatus, and a computer-readable storage medium, relating to the field of image compression. The method comprises: acquiring a plurality of macroblocks of an image; determining the sub-region(s) of each one of the plurality of macroblocks and a partition color of each macroblock; determining a data compression format corresponding to each macroblock according to pixels in the sub-region(s) of each macroblock and the partition color of each macroblock; and compressing each macroblock based on the data compression format corresponding to each macroblock, and determining the compressed data corresponding to each macroblock. In the embodiments of the present disclosure, while ensuring the image compression efficiency, the image compression format is simplified, the image compression accuracy is guaranteed, and the over drive distortion caused by image compression is reduced.

11 Claims, 4 Drawing Sheets

(51) Int. Cl.
  *H04N 19/126* (2014.01)
  *H04N 19/176* (2014.01)
  *H04N 19/186* (2014.01)

(56) References Cited

U.S. PATENT DOCUMENTS

2016/0353122 A1* 12/2016 Krajcevski .......... H03M 7/3084
2021/0287404 A1* 9/2021 Chang .................... H04N 19/12
2021/0409765 A1* 12/2021 De ........................ H04N 19/122

FOREIGN PATENT DOCUMENTS

| CN | 108289223 A | 7/2018 |
| CN | 113784126 A | 12/2021 |
| WO | 2006090334 A2 | 8/2006 |

OTHER PUBLICATIONS

Yun-Hai, L. et al., "Motion complexity-based rate control for video coding", Journal of Zhejiang University, Apr. 2009, pp. 710-715, vol. 43 No. 4. [English Translation of Abstract Only].

* cited by examiner

IMAGE COMPRESSION METHOD, APPARATUS, AND COMPUTER-READABLE STORAGE MEDIUM

CROSS-REFERENCE TO RELATED APPLICATIONS

The present disclosure is based on and claims priority to China Patent Application No. 202210051253.6, filed on Jan. 17, 2022, in the China National Intellectual Property Administration, the disclosures of which are incorporated by reference herein in their entirety.

TECHNICAL FIELD

The present disclosure relates to the technical field of computers, and in particular to an image compression method, an apparatus, and a computer-readable storage medium.

BACKGROUND

In the prior art, over drive compression (ODC) is a key technique for liquid crystal displays (LCDs). Over drive compression technique generally utilizes the correlation of image spatial information to remove redundant information as much as possible for the purpose of image compression. However, the compression format of the over drive compression technique is not fixed or too simple, which will increase the hardware cost or increase the over drive distortion caused by compression, affecting the overall display quality and reducing the market competitiveness of the chip. With the increasing resolution of images and the increasing complexity of compression techniques, it is particularly important to improve the image compression efficiency.

SUMMARY

In view of the shortcomings of the existing methods, the present disclosure proposes an image compression method, an apparatus, a computer-readable storage medium and a computer program product, which are used to solve the problem of how to improve the image compression efficiency.

In a first aspect, the present disclosure provides an image compression method, including:
  acquiring a plurality of macroblocks of an image;
  determining sub-region(s) of each one of the plurality of macroblocks and a partition color of each macroblock;
  determining a data compression format corresponding to each macroblock according to pixels in the sub-region(s) of each macroblock and the partition color of each macroblock; and
  compressing each macroblock based on the data compression format corresponding to each macroblock, and determining the compressed data corresponding to each macroblock.

In one embodiment, determining the sub-region(s) of each one of the plurality of macroblocks includes:
  dividing each one of the plurality of macroblocks into at least one sub-region, each one of the at least one sub-region being a texture region or a flat region.

In one embodiment, determining the partition color of each macroblock includes at least one of the following:
  if a sub-region of each macroblock is a texture region, determining two partition colors of the sub-region according to pixel values corresponding to the pixels in the sub-region; and
  if a sub-region of each macroblock is a flat region, determining a partition color mean value corresponding to one partition color of the sub-region according to a pixel mean value corresponding to all pixels in the sub-region.

In one embodiment, determining a data compression format corresponding to each macroblock according to pixels in the sub-region(s) of each macroblock and the partition color of each macroblock includes at least one of the following:
  if a sub-region of each macroblock is a texture region, determining a quantized weight index for pixels in the sub-region of each macroblock according to the pixels in the sub-region of each macroblock and the partition color of the sub-region of each macroblock; and determining a data compression format corresponding to each macroblock according to the pixels in the sub-region of each macroblock, the partition color of the sub-region of each macroblock and the quantized weight index for pixels in the sub-region of each macroblock; and
  if a sub-region of each macroblock is a flat region, determining a data compression format corresponding to each macroblock according to the pixels in the sub-region of each macroblock and the partition color mean value corresponding to one partition color of the sub-region of each macroblock.

In one embodiment, determining a quantized weight index for pixels in a sub-region of each macroblock according to the pixels in the sub-region of each macroblock and the partition color of the sub-region of each macroblock includes:
  quantizing the partition color of the sub-region of each macroblock to obtain a plurality of color values; and
  for a pixel in the sub-region of each macroblock, determining respective distances between each one of the plurality of color values and the pixel, and determining the index number of a color value corresponding to the smallest distance among the respective distances as the quantized weight index of the pixel.

In one embodiment, information in the data compression format corresponding to each macroblock includes at least one of the compression format flag, the flat region flag, the partition map for each pixel in the sub-region of each macroblock, the partition color of the sub-region of each macroblock, the quantized weight index for pixels in the sub-region(s) of each macroblock, and the partition color mean value corresponding to one partition color of the sub-region of each macroblock.

In a second aspect, the present disclosure provides an image compression apparatus, including a processor,
  the processor is configured to perform the following operations:
  acquiring a plurality of macroblocks of an image;
  determining sub-region(s) of each one of the plurality of macroblocks and a partition color of each macroblock;
  determining a data compression format corresponding to each macroblock according to pixels in the sub-region(s) of each macroblock and the partition color of each macroblock; and
  compressing each macroblock based on the data compression format corresponding to each macroblock, and determining the compressed data corresponding to each macroblock.

In one embodiment, the operation of determining sub-region(s) of each one of the plurality of macroblocks and a partition color of each macroblock, includes:

dividing each one of the plurality of macroblocks into at least one sub-region, each one of the at least one sub-region being a texture region or a flat region.

In one embodiment, the operation of determining sub-region(s) of each one of the plurality of macroblocks and a partition color of each macroblock, includes at least one of the following:

- if a sub-region of each macroblock is a texture region, determining two partition colors of the sub-region according to pixel values corresponding to the pixels in the sub-region; and
- if a sub-region of each macroblock is a flat region, determining a partition color mean value corresponding to one partition color of the sub-region according to a pixel mean value corresponding to all pixels in the sub-region.

In one embodiment, the operation of determining a data compression format corresponding to each macroblock according to pixels in the sub-region(s) of each macroblock and the partition color of each macroblock includes at least one of the following:

- if a sub-region of each macroblock is a texture region, determining a quantized weight index for pixels in the sub-region of each macroblock according to the pixels in the sub-region of each macroblock and the partition color of the sub-region of each macroblock; and determining a data compression format corresponding to each macroblock according to the pixels in the sub-region of each macroblock, the partition color of the sub-region of each macroblock and the quantized weight index for pixels in the sub-region of each macroblock; and
- if a sub-region of each macroblock is a flat region, determining a data compression format corresponding to each macroblock according to the pixels in the sub-region of each macroblock and the partition color mean value corresponding to one partition color of the sub-region of each macroblock.

In one embodiment, the operation of determining a data compression format corresponding to each macroblock according to pixels in the sub-region(s) of each macroblock and the partition color of each macroblock includes:

- quantifying the partition color of the sub-region of each macroblock to obtain a plurality of color values; and
- for a pixel in the sub-region of each macroblock, determining respective distances between each one of the plurality of color values and the pixel, and determining the index number of a color value corresponding to the smallest distance among the respective distances as the quantized weight index of the pixel.

In one embodiment, information in the data compression format corresponding to each macroblock includes at least one of the compression format flag, the flat region flag, the partition map for each pixel in the sub-region of each macroblock, the partition color of the sub-region of each macroblock, the quantized weight index for pixels in the sub-region(s) of each macroblock, and the partition color mean value corresponding to one partition color of the sub-region of each macroblock.

In a third aspect, the present disclosure provides an electronic device, including a processor, a memory and a bus;

- the bus is configured to connect the processor and the memory;
- the memory is configured to store operating instructions;
- the processor is configured to execute the image compression method of the first aspect of the present disclosure by invoking the operating instructions.

In a fourth aspect, the present disclosure provides a computer-readable storage medium having computer programs stored thereon, and the computer program is used to execute the image compression method of the first aspect of the present disclosure.

In a fifth aspect, the present disclosure provides a computer program product including computer programs that, when executed by a processor, implement steps of the image compression method of the first aspect of the present disclosure.

The technical solutions of the embodiments of the present disclosure at least have the following beneficial effects.

A plurality of macroblocks of an image are acquired; sub-region(s) of each one of the plurality of macroblocks and the partition color of each macroblock are determined; a data compression format corresponding to each macroblock is determined according to pixels in the sub-region(s) of each macroblock and the partition color of each macroblock; and each macroblock is compressed based on the data compression format corresponding to each macroblock, and the compressed data corresponding to each macroblock is determined. In this way, while ensuring the image compression efficiency, the image compression format is simplified, the image compression accuracy is guaranteed, and the over drive distortion caused by image compression is reduced.

BRIEF DESCRIPTION OF THE DRAWINGS

To describe the technical solutions of the embodiments of the present disclosure more clearly, the drawings to be used in the description of the embodiments of the present disclosure will be described briefly.

DETAILED DESCRIPTION

Figure 1:
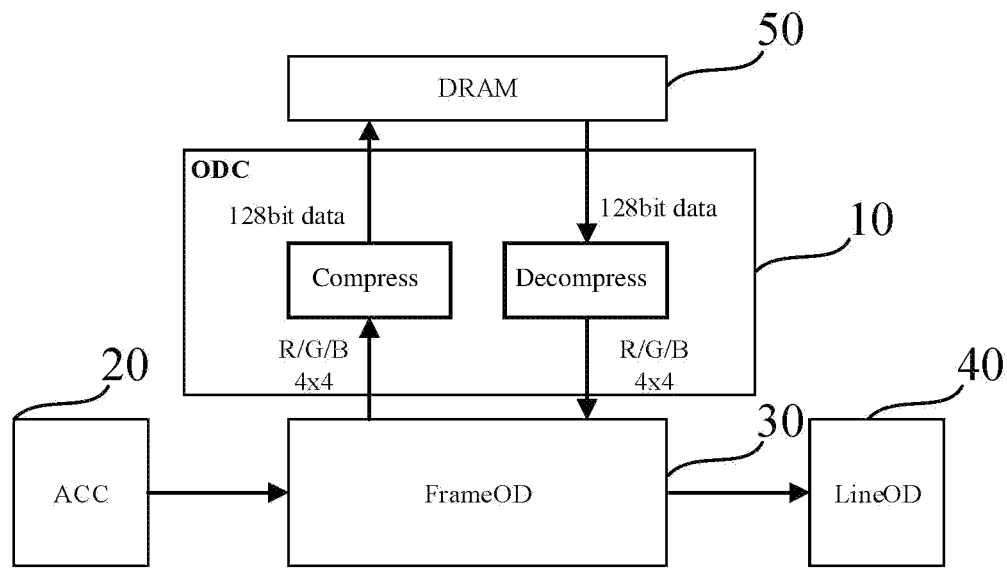
FIG. 1 is a schematic diagram of the architecture of an image compression system according to an embodiment of the present disclosure.

Embodiments of the present disclosure will be described below with reference to the accompanying drawings in the present disclosure. It should be understood that the embodiments to be described below with reference to the accompanying drawings are exemplary descriptions for explaining the technical solutions of the embodiments of the present disclosure, and do not limit the technical solutions of the embodiments of the present disclosure.

It may be understood by a person of ordinary skill in the art that singular forms "a", "an" and "the" used herein may include plural forms as well, unless otherwise stated. It should be further understood that the terms "comprising" and "including" used in the embodiments of the present disclosure mean that corresponding features may be implemented as presented features, information, data, steps, operations, elements and/or components, but do not exclude that they are implemented as other features, information, data, steps, operations, elements, components, and/or combinations thereof as supported in the art. It should be understood that, when an element is referred as being "connected to" or "coupled to" another element, this element may be directly connected or coupled to the other element, or this element and the other element may be connected through intervening elements. In addition, "connected to" or "coupled to" as used herein may include wireless connection or wireless coupling. The term "and/or" as used herein indicates at least one of the items defined by the term, e.g., "A and/or B" may be implemented as "A", or as "B", or as "A and B".

Research on relevant techniques shows that: (1) the display stream compression (DSC) mainly consist of a prediction module, a quantization module, a code rate control module and an entropy coding module. This compression method has high precision and can achieve a high compression ratio. However, the hardware implementation is complex, and the code rate is not constant; and the compression format is related to the image content. (2) The compression method based on block truncation coding (BTC) is a method with very low complexity. Its compression format is simple, including only the partition map, mean value and variance information. However, when the image blocks are large in size, this method will have obvious blocking effect, resulting in low compression effect.

Accordingly, in order to solve at least one of the existing problems in image compression and to better meet the needs of image compression, the present disclosure provides an image compression method based on which, while ensuring the image compression efficiency, the image compression format is simplified, the image compression accuracy is guaranteed, and the over drive distortion caused by image compression is reduced.

To make the purposes, technical solutions and advantages of the present disclosure clearer, the implementations of the present disclosure will be further described below in detail with reference to the accompanying drawings.

For better understanding and explanation of the solutions of the embodiments of the present disclosure, some technical terms involved in the embodiments of the present disclosure will be briefly described below.

Due to the physical property of LCDs that the liquid crystal has slow response, it is necessary to use the over drive technique to solve the blurring problem of dynamic pictures. In the over drive technique, lookup table processing is performed according to the image data of the previous frame stored in the frame buffer and the image data of the current frame to obtain the over drive value of each pixel. The image data of the previous frame involved needs to be compressed by the ODC technique. The video resolution has transitioned from 720p and 1080p to the current mainstream 4K video resolution in the market. The multiple increase of the resolution has brought a great impact on the frame buffer and bandwidth transmission, and further caused a substantial increase in the cost of the chip area. In order to reduce the capacity of the frame buffer and the transmission bandwidth, it is necessary to use the efficient ODC technique to compress the image.

Macroblock: macroblock is a basic concept in the video coding technique. In each image, several macroblocks are arranged in the form of slices. The video coding algorithm is performed in unit of macroblocks, where the coding is performed on a macroblock by macroblock basis to form a continuous video bitstream.

RGB: The RGB color pattern is a color standard in the industry. A variety of colors are obtained by changing the three color channels of red (R), green (G), and blue (B) and performing superimposition among them. RGB are colors that represent the three channels of red, green and blue.

The technical solutions of the present disclosure and how to solve the above technical problems by the technical solutions of the present disclosure will be described below by specific embodiments in detail. The specific embodiments to be described below may be combined, and the same or similar concepts or processes may be not repeated in some embodiments. The embodiments of the present disclosure will be described below with reference to the accompanying drawings.

The solutions provided by the embodiments of the present disclosure may be applicable to any application scenarios in the field of image compression that require image compression.

In order to better understand the solutions provided by the embodiments of the present disclosure, the solutions will be described below with reference to a specific application scenario.

In one embodiment, FIG. 1 shows a schematic diagram of the architecture of an image compression system to which the embodiments of the present disclosure are applied. It may be understood that the image compression methods provided by the embodiments of the present disclosure may be applicable to, but not limited to, application scenarios as shown in FIG. 1.

In this example, as shown in FIG. 1, the architecture of the image compression system in this example may include, but is not limited to, Over Drive Compression (ODC) 10, Accurate Color Capture (ACC) 20, Frame Over Drive (FrameOD) 30, Line Over Drive (LineOD) 40 and Dynamic Random Access Memory (DRAM) 50, wherein ODC 10, ACC 20, FrameOD 30, LineOD 40 and DRAM 50 may be in a chip, and the chip may be in a server. The ODC 10 acquires a plurality of macroblocks of an image from the FrameOD 30, that is, 4×4 R/G/B macroblocks; the ODC 10 determines sub-region(s) of each one of the plurality of macroblocks and partition color of each macroblock; the ODC 10 determines a data compression format corresponding to each macroblock according to pixels in the sub-region(s) of each macroblock and the partition color of each macroblock; the ODC 10 compresses each macroblock based on the data compression format corresponding to each macroblock, and determines the compressed data (that is, 128-bit data) corresponding to each macroblock. The ODC 10 may store the compressed data corresponding to each macroblock in the DRAM 50. The ODC 10 may decompress and parse the 128-bit data to recover the data at each pixel position.

It may be understood that the above is only an example and is not limited in this embodiment.

The chip may be a TCON chip. The TCON chip is a main control chip of the liquid crystal display panel. The server may be an independent physical server, a server cluster or a distributed system composed of a plurality of physical servers, or a cloud server or server cluster that provides basic cloud computing services such as cloud services, cloud databases, cloud computing, cloud functions, cloud storage, network services, cloud communication, intermediate services, domain name services, security services, Content Delivery Network (CDN) and big data and artificial intelligence platforms. Specifically, it may also be determined based on actual application scenario requirements, which is not limited here.

Figure 2:
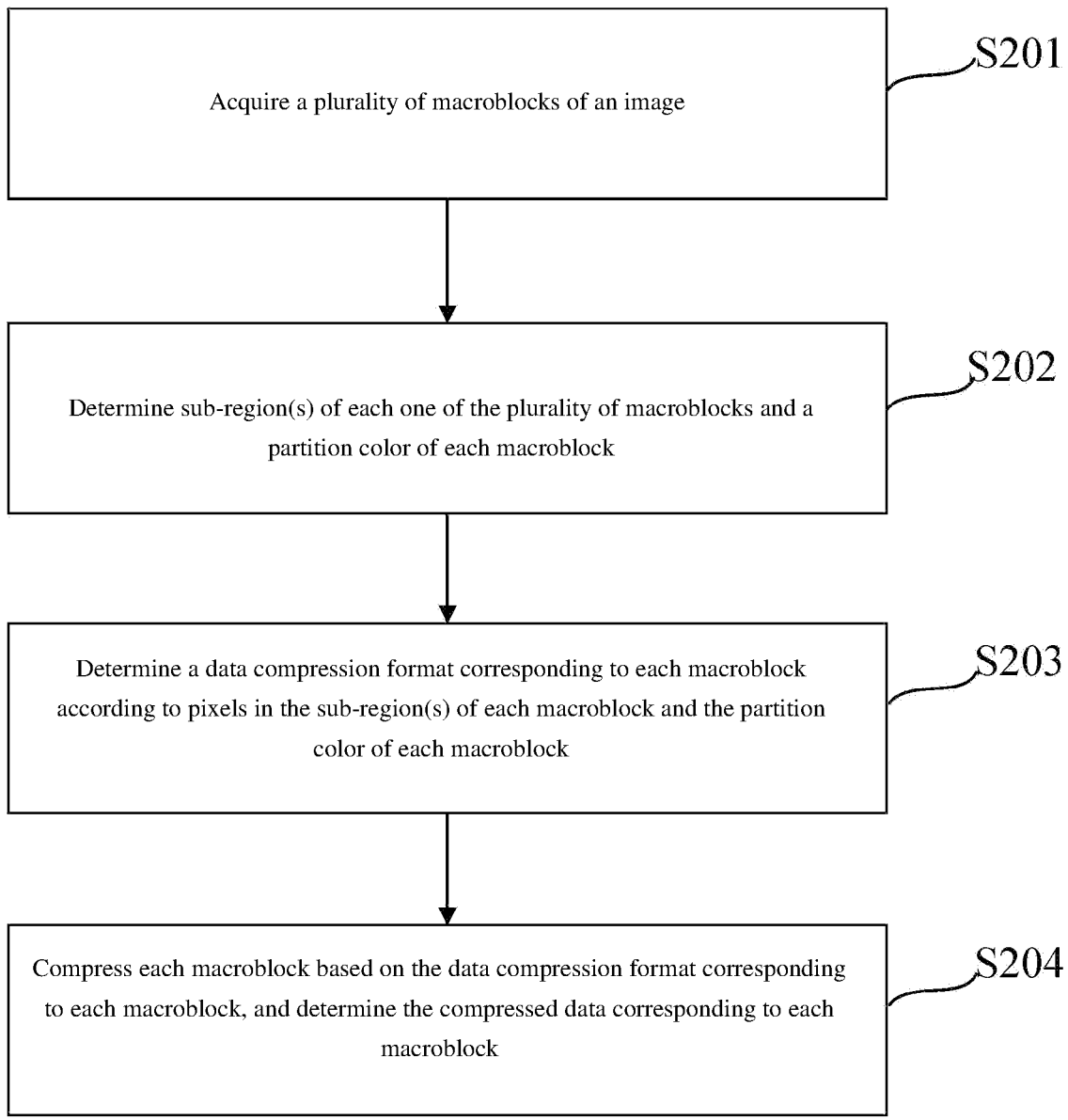
FIG. 2 is a schematic flowchart of an image compression method according to an embodiment of the present disclosure.

Referring to FIG. 2, FIG. 2 shows a schematic flowchart of an image compression method according to an embodiment of the present disclosure. The method may be executed by any electronic device, for example, a server. As an optional implementation, the method may be executed by a server. For the convenience of description, in the description of some optional embodiments below, the explanation will be given by taking the server as a subject for executing the method. As shown in FIG. 2, the image compression method according to the embodiment of the present disclosure includes the following steps.

S201: A plurality of macroblocks of an image are acquired.

Specifically, the macroblocks may be 4×4 R/G/B macroblocks. For example, one macroblock may include 16 pixels, each pixel corresponds to one pixel value, and the pixel value may be the RGB value of the pixel.

S202: The sub-region(s) of each one of the plurality of macroblocks and the partition color of each macroblock are determined.

Specifically, when the colors of the pixels in a macroblock are relatively close or in a linear relationship, there may be no need to partition the macroblock, that is, the macroblock is of one partition and the macroblock has a unique sub-region. When the colors of the pixels in a macroblock include two color clusters in a linear relationship, the macroblock is divided into two sub-regions according to the type of colors, and the pixels in each sub-region are in a linear relationship, that is, the macroblock is of two partitions. When the colors of the pixels in a macroblock include more than two color clusters in a linear relationship, the macroblock is divided into three sub-regions by a clustering method, that is, the macroblock is of three partitions.

S203: A data compression format corresponding to each macroblock is determined according to pixels in the sub-region(s) of each macroblock and the partition color of each macroblock.

Figure 3:
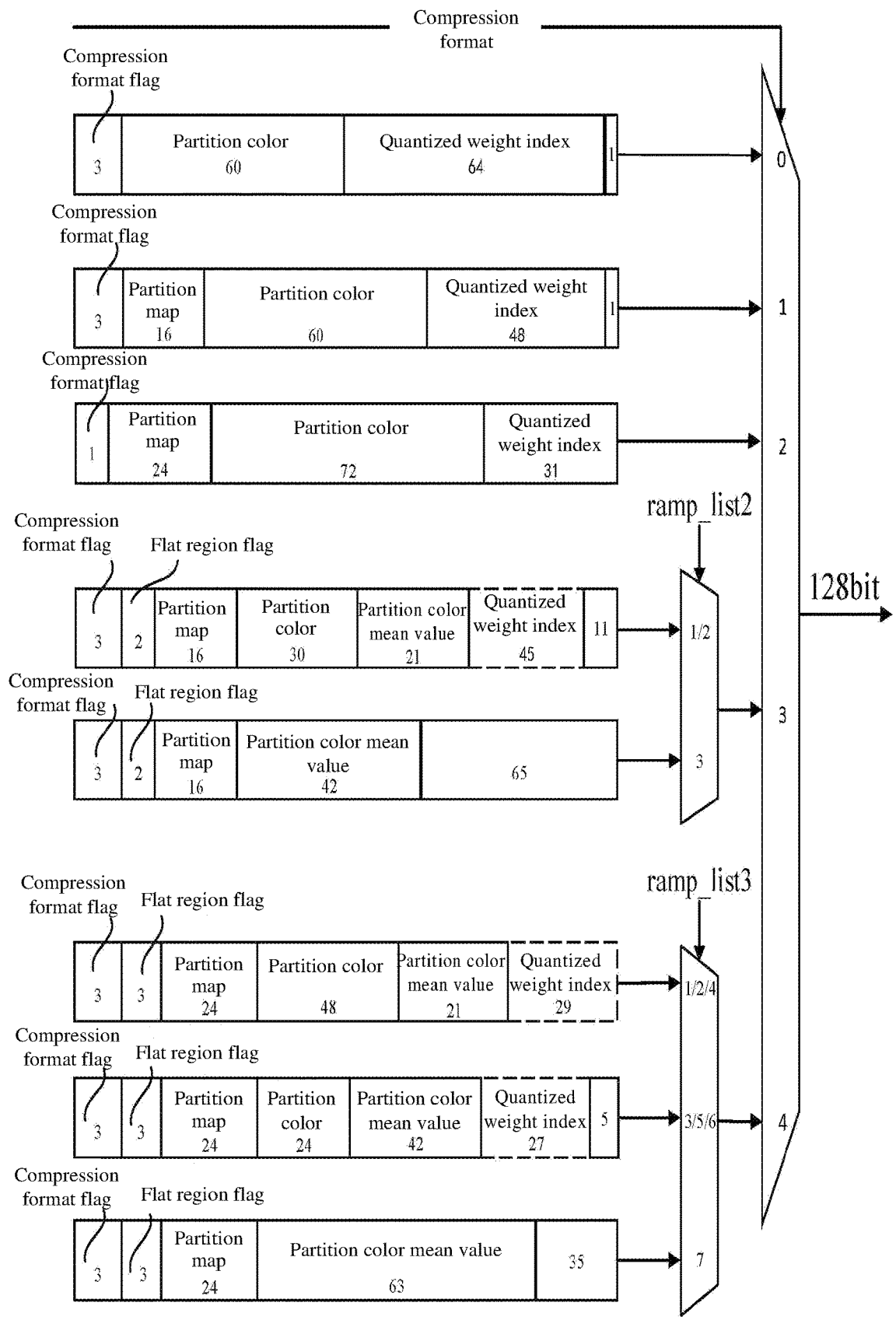
FIG. 3 is a schematic diagram of a data compression format corresponding to a macroblock according to an embodiment of the present disclosure.

Specifically, the partition color may be one or two sets of RGB values. When the sub-region is a texture region, the partition color is two sets of RGB values; when the sub-region is a flat region, the partition color is a set of RGB values, that is, the partition color mean value corresponding to the partition color is a set of RGB values. As shown in FIG. 3, the data compression format corresponding to each macroblock may include five compression formats: compression format 0, compression format 1, compression format 2, compression format 3 and compression format 4, respectively.

S204: Each macroblock is compressed based on the data compression format corresponding to each macroblock, and the compressed data corresponding to each macroblock is determined.

Specifically, each macroblock is compressed to determine the compressed data (that is, 128-bit data) corresponding to each macroblock.

In the embodiment of the present disclosure, a plurality of macroblocks of an image are acquired; the sub-region(s) of each one of the plurality of macroblocks and the partition color of each macroblock are determined; a data compression format corresponding to each macroblock is determined according to pixels in the sub-region(s) of each macroblock and the partition color of each macroblock; and each macroblock is compressed based on the data compression format corresponding to each macroblock, and the compressed data corresponding to each macroblock is determined. In this way, while ensuring the image compression efficiency, the image compression format is simplified, the image compression accuracy is guaranteed, and the over drive distortion caused by image compression is reduced.

In one embodiment, determining the sub-region(s) of each one of the plurality of macroblocks includes:

dividing each one of the plurality of macroblocks into at least one sub-region, each one of the at least one sub-region being a texture region or a flat region.

For example, as shown in FIG. 3, the data compression format corresponding to each macroblock may include five compression formats: compression format 0, compression format 1, compression format 2, compression format 3 and compression format 4, respectively; wherein, the macroblock corresponding to the compression format 0 is divided into a sub-region, and the sub-region is a texture region; the macroblock corresponding to the compression format 1 is divided into two sub-regions, and the two sub-regions are both texture regions; the macroblock corresponding to the compression format 2 is divided into three sub-regions, and the three sub-regions are all texture regions; the macroblock corresponding to the compression format 3 is divided into two sub-regions, and the two sub-regions may be a texture region and a flat region, or the two sub-regions may be both flat regions; the macroblock corresponding to the compression format 4 is divided into three sub-regions, and the three sub-regions may be a texture region, a texture region and a flat region respectively, the three sub-regions may be a texture region, a flat region and a flat region respectively, or the three sub-regions may be all flat regions.

In one embodiment, determining the partition color of each macroblock includes at least one of the following:
  if a sub-region of each macroblock is a texture region, determining two partition colors of the sub-region according to pixel values corresponding to the pixels in the sub-region; and
  if a sub-region of each macroblock is a flat region, determining a partition color mean value corresponding to one partition color of the sub-region according to a pixel mean value corresponding to all pixels in the sub-region.

For example, as shown in FIG. 3, the macroblock corresponding to the compression format 0 is divided into a sub-region, and the sub-region is a texture region; the macroblock corresponding to the compression format 0 are in one partition, and when the colors of the pixels in a macroblock are relatively close or in a linear relationship, there is no need to partition the macroblocks, and two partition colors of the sub-region are determined by the pixel values corresponding to all pixels in the macroblock.

As shown in FIG. 3, the macroblock corresponding to the r in a linear relationship, there is no need to partition the macroblocks, and two partition colors of the sub-region are determined by the pixel values corresponding to all pixels in the macroblockscompression format 3 is divided into two sub-regions, and the two sub-regions may be a texture region and a flat region respectively; wherein, the partition color mean value corresponding to one partition color of the flat region is determined according to the pixel mean value corresponding to all pixels in the flat region. Specifically, the mean value of the R values of all pixels in the flat region is the R value of this partition color, the mean value of the G values of all pixels in the flat region is the G value of this partition color, and the mean value of the B values of all pixels in the flat region is the B value of this partition color.

In one embodiment, determining a data compression format corresponding to each macroblock according to pixels in the sub-region(s) of each macroblock and the partition color of each macroblock includes at least one of the following:

if a sub-region of each macroblock is a texture region, determining a quantized weight index for pixels in the sub-region of each macroblock according to the pixels in the sub-region of each macroblock and the partition color of the sub-region of each macroblock; and determining a data compression format corresponding to each macroblock according to the pixels in the sub-region of each macroblock, the partition color of the sub-region of each macroblock and the quantized weight index for pixels in the sub-region of each macroblock; and if a sub-region of each macroblock is a flat region, determining a data compression format corresponding to each macroblock according to the pixels in the sub-region of each macroblock and the partition color mean value corresponding to one partition color of the sub-region of each macroblock.

For example, as shown in FIG. 3, the macroblock corresponding to the compression format 0 is divided into a sub-region, and the sub-region is a texture region; and a data compression format (that is, the compression format 0) corresponding to the macroblock is determined according to the pixels in the sub-region of the macroblock, the partition color of the sub-region of the macroblock and the quantized weight index for pixels in the sub-region of the macroblock. The compression format 0 includes the compression format flag, the partition color of the sub-region of the macroblock, and the quantized weight index for the pixels in the sub-region of the macroblock.

In one embodiment, determining a quantized weight index for pixels in a sub-region of each macroblock according to the pixels in the sub-region of each macroblock and the partition color of the sub-region of each macroblock includes:

quantizing the partition color of the sub-region of each macroblock to obtain a plurality of color values; and
for a pixel in the sub-region of each macroblock, determining respective distances between each one of the plurality of color values and the pixel, and determining the index number of a color value corresponding to the smallest distance among the respective distances as the quantized weight index of the pixel.

For example, as shown in FIG. 3, the macroblock corresponding to the compression format 0 is divided into a sub-region, and the sub-region is a texture region; two partition colors of the sub-region are determined by the pixel values corresponding to all pixels in the macroblock; each partition color is quantified to 16 color values; for a pixel in the sub-region of the macroblock, respective distances between each of the 16 color values and the pixel are determined, and the index number of a color value corresponding to the smallest distance among the respective distances is determined as the quantized weight index of the pixel.

In one embodiment, information in the data compression format corresponding to each macroblock includes at least one of the compression format flag, the flat region flag, the partition map for each pixel in a sub-region of each macroblock, the partition color of the sub-region of each macroblock, the quantized weight index for pixels in the sub-region of each macroblock, and the partition color mean value corresponding to one partition color of the sub-region of each macroblock.

For example, as shown in FIG. 3, the macroblock corresponding to the compression format 4 is divided into three sub-regions, and the three sub-regions may be a texture region, a texture region and a flat region respectively. The compression format 4 corresponding to the macroblock includes the compression format flag, the flat region flag, the partition map for each pixel in the sub-region of the macroblock, the partition color of the sub-region of the macroblock, the quantized weight index for pixels in the sub-region of the macroblock, and the partition color mean value corresponding to one partition color of the sub-region of the macroblock.

This embodiment of the present disclosure at least has the following beneficial effects.

While ensuring the image compression efficiency, the image compression format is simplified, the image compression accuracy is guaranteed, and the over drive distortion caused by image compression is reduced.

For better understanding of the methods according to the embodiments of the present disclosure, the solutions of the embodiments of the present disclosure will be further described below with reference to examples of specific application scenarios.

The solutions provided by the embodiments of the present disclosure may be applicable to any application scenarios in the field of image compression that require image compression.

In one embodiment, the data compression format corresponding to the macroblock is shown in FIG. 3.

(1) Compression Format 0

The compression format 0 corresponds to a case in which the macroblock is of one partition. The macroblock corresponding to the compression format 0 is divided into a sub-region, and the sub-region is a texture region. When the colors of the pixels in the macroblock are relatively close or in a linear relationship, there is no need to partition the macroblock. Two partition colors are determined by all pixels in the macroblock; then each partition color is quantified to 16 color values; respective distances between each pixel and the 16 color values are determined, and the index number of a color value corresponding to the smallest distance among the respective distances is determined as the quantized weight index of the pixel. The compression format flag in the compression format 0 occupies 3 bits; each of the two partition colors corresponds to 3 channels: the R channel, the G channel and the B channel, each channel occupies 10 bits, and all channels for the two partition colors occupy a total of 60 bits; the quantized weight index of each pixel occupies 4 bits, occupying a total of 64 bits. The compression format flag, all channels for the two partition colors, and the quantized weight index of all pixels occupy a total of 127 bits, and the remaining 1 bit in the compression format 0 may be padded with 0.

(2) Compression Format 1

The compression format 1 corresponds to the case where the macroblock is of two partitions, and the sub-regions are texture regions. When the colors of the pixels in a macroblock include two color clusters in a linear relationship, the macroblock is divided into two sub-regions according to the type of colors, and the pixels in each sub-region are in a linear relationship. Then the partition color of each sub-region is determined; the partition colors of the two sub-regions (each sub-region has two partition colors) are quantified to 8 color values respectively; respective distances between each pixel in a corresponding sub-region and the 8 color values are determined, and the index number of a color value corresponding to the smallest distance among the respective distances is determined as the quantized weight index of the pixel. The compression format flag occupies 3 bits; the partition map for each pixel occupies 1 bit, occupying a total of 16 bits; each channel for the four partition colors occupies 5 bits, occupying a total of 60 bits; the quantized weight index of each pixel occupies 3 bits, occupying a total of 48 bits. The compression format flag, the partition map of all pixels, all channels for the four partition colors, and the quantized weight index of all pixels occupy a total of 127 bits, and the remaining 1 bit in the compression format 1 may be padded with 0.

(3) Compression Format 2

The compression format 2 corresponds to the case where the macroblock is of three partitions, and the sub-regions are texture regions. When the colors of the pixels in a macroblock include more than two color clusters in a linear relationship, the macroblock is divided into three sub-regions by a clustering method. Then the partition color of each sub-region is calculated; the partition colors of the three sub-regions are quantified to 4 color values respectively; respective distances between each pixel in a corresponding sub-region and the 4 color values are determined, and the index number of a color value corresponding to the smallest distance among the respective distances is determined as the quantized weight index of the pixel. The compression format flag occupies 1 bit; the partition map for each pixel occupies 2 bits, occupying a total of 24 bits after optimization; each channel for the six partition colors occupies 4 bits, occupying a total of 72 bits; the quantized weight index of each pixel occupies 2 bits, occupying a total of 31 bits with the first bit of quantized weight index of the first pixel position being fixed. The compression format flag, the partition map of all pixels, all channels for the six partition colors, and the quantized weight index of all pixels occupy a total of 128 bits.

(4) Compression Format 3

The compression format 3 corresponds to the case where the macroblock is of two partitions, and at least one of the sub-regions is a flat region.

1. One of the Sub-Regions is a Flat Region.

The compression format flag occupies 3 bits; the flat region flag (ramp_list) occupies 2 bits; the partition map for each pixel occupies 1 bit, occupying a total of 16 bits; each channel for the two partition colors occupies 5 bits, occupying a total of 30 bits; each channel corresponding to one partition color mean value (partition color_mean) occupies 7 bits, occupying a total of 21 bits; the quantized weight index of each pixel except the flat region occupies 3 bits, occupying a total of 45 bits at most. The above information occupies a total of 117 bits, and the remaining 11 bits in the compression format 3 may be padded with 0.

2. Both Sub-Regions are Flat Regions.

The compression format flag occupies 3 bits; the flat region flag occupies 2 bits; the partition map for each pixel occupies 1 bit, occupying a total of 16 bits; each channel corresponding to the two partition color mean values occupies 7 bits, occupying a total of 42 bits. The above information occupies a total of 63 bits, and the remaining 65 bits in the compression format 3 may be padded with 0.

(5) Compression Format 4

The compression format 4 corresponds to the case where the macroblock is of three partitions, and at least one of the sub-regions is a flat region.

1. One of the Sub-Regions is a Flat Region.

The compression format flag occupies 3 bits; the flat region flag occupies 3 bits; the partition map for each pixel occupies 2 bits, occupying a total of 24 bits after optimization; each channel for the four partition colors occupies 4 bits, occupying a total of 48 bits; each channel for one partition color mean value occupies 7 bits, occupying a total of 21 bits; the quantized weight index of each pixel except the flat region occupies 2 bits, occupying a total of 29 bits at most with the first bit of quantized weight index of the first pixel position being fixed. The above information occupies a total of 128 bits.

2. Two of the Sub-Regions are Flat Regions.

The compression format flag occupies 3 bits; the flat region flag occupies 3 bits; the partition map for each pixel occupies 2 bits, occupying a total of 24 bits after optimization; each channel for the two partition colors occupies 4 bits, occupying a total of 24 bits; each channel for the two partition color mean value occupies 7 bits, occupying a total of 42 bits; the quantized weight index of each pixel except the flat region occupies 2 bits, occupying a total of 27 bits at most with the first bit of quantized weight index of the first pixel position being fixed. The above information occupies a total of 123 bits, and the remaining 5 bits in the compression format 4 may be padded with 0.

3. The Three Sub-Regions are all Flat Regions.

The compression format flag occupies 3 bits; the flat region flag occupies 3 bits; the partition map for each pixel occupies 2 bits, occupying a total of 24 bits; each channel for the three partition color mean values occupies 7 bits, occupying a total of 63 bits. The above information occupies a total of 93 bits, and the remaining 35 bits in the compression format 4 may be padded with 0.

This embodiment of the present disclosure at least has the following beneficial effects.

Based on the five compression formats, the compression format can be automatically switched according to the color complexity in the macroblocks to improve the overall compression efficiency; according to the partitioning result of a macroblock, the texture complexity of each sub-region can be further judged in case of two partitions and three partitions, and a new compression format can be designed for a macroblock containing flat regions, which can further improve the compression accuracy of flat regions and decrease the error instability caused by compression mode switching.

Figure 4:
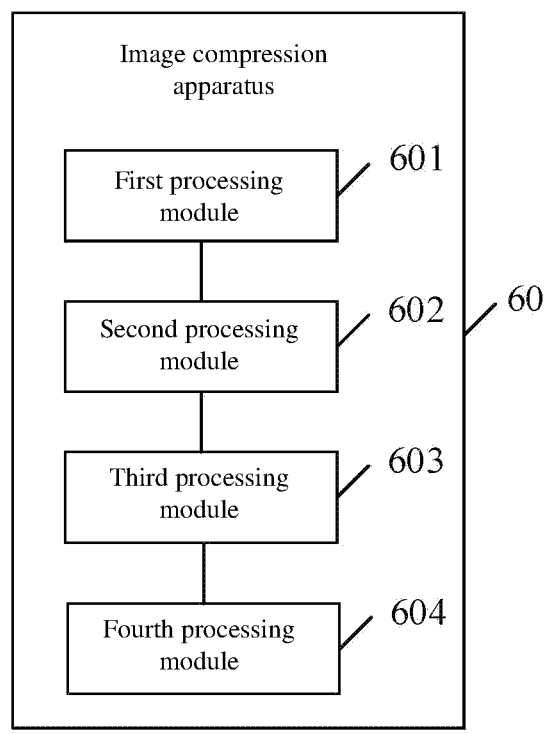
FIG. 4 is a schematic structure diagram of an image compression apparatus according to an embodiment of the present disclosure.

An embodiment of the present disclosure further provides an image compression apparatus. The schematic structure diagram of the image compression apparatus is shown in FIG. 4. The image compression apparatus 60 includes a first processing module 601, a second processing module 602, a third processing module 603 and a fourth processing module 604.

The first processing module 601 is configured to acquire a plurality of macroblocks of an image;

the second processing module 602 is configured to determine the sub-region(s) of each one of the plurality of macroblocks and the partition color of each macroblock;

the third processing module 603 is configured to determine a data compression format corresponding to each macroblock according to pixels in the sub-region(s) of each macroblock and the partition color of each macroblock; and the fourth processing module 604 is configured to compress each macroblock based on the data compression format corresponding to each macroblock, and determine the compressed data corresponding to each macroblock.

In one embodiment, the second processing module 602 is specifically configured to:

divide each one of the plurality of macroblocks into at least one sub-region, each one of the at least one sub-region being a texture region or a flat region.

In one embodiment, the second processing module 602 is specifically configured to execute at least one of the following:

if a sub-region of each macroblock is a texture region, determine two partition colors of the sub-region according to pixel values corresponding to the pixels in the sub-region; and if a sub-region of each macroblock is a flat region, determine a partition color mean value corresponding to one partition color of the sub-region according to a pixel mean value corresponding to all pixels in the sub-region.

In one embodiment, the third processing module 603 is specifically configured to execute at least one of the following:

if a sub-region of each macroblock is a texture region, determine a quantized weight index for pixels in the sub-region of each macroblock according to the pixels in the sub-region of each macroblock and the partition color of the sub-region of each macroblock; and determine a data compression format corresponding to each macroblock according to the pixels in the sub-region of each macroblock, the partition color of the sub-region of each macroblock and the quantized weight index for pixels in the sub-region of each macroblock; and if a sub-region of each macroblock is a flat region, determine a data compression format corresponding to each macroblock according to the pixels in the sub-region of each macroblock and the partition color mean value corresponding to one partition color of the sub-region of each macroblock.

In one embodiment, the third processing module 603 is specifically configured to:

quantify the partition color of the sub-region of each macroblock to obtain a plurality of color values; and for a pixel in the sub-region of each macroblock, determine respective distances between each one of the plurality of color values and the pixel, and determine the index number of a color value corresponding to the smallest distance among the respective distances as the quantized weight index of the pixel.

In one embodiment, information in the data compression format corresponding to each macroblock includes at least one of the compression format flag, the flat region flag, the partition map for each pixel in the sub-region of each macroblock, the partition color of the sub-region of each macroblock, the quantized weight index for pixels in the sub-region(s) of each macroblock, and the partition color mean value corresponding to one partition color of the sub-region of each macroblock.

This embodiment of the present disclosure at least has the following beneficial effects.

A plurality of macroblocks of an image are acquired; the sub-region(s) of each one of the plurality of macroblocks and the partition color of each macroblock are determined; a data compression format corresponding to each macroblock is determined according to pixels in the sub-region(s) of each macroblock and the partition color of each macroblock; and each macroblock is compressed based on the data compression format corresponding to each macroblock, and the compressed data corresponding to each macroblock is determined. In this way, while ensuring the image compression efficiency, the image compression format is simplified, the image compression accuracy is guaranteed, and the over drive distortion caused by image compression is reduced.

Figure 5:
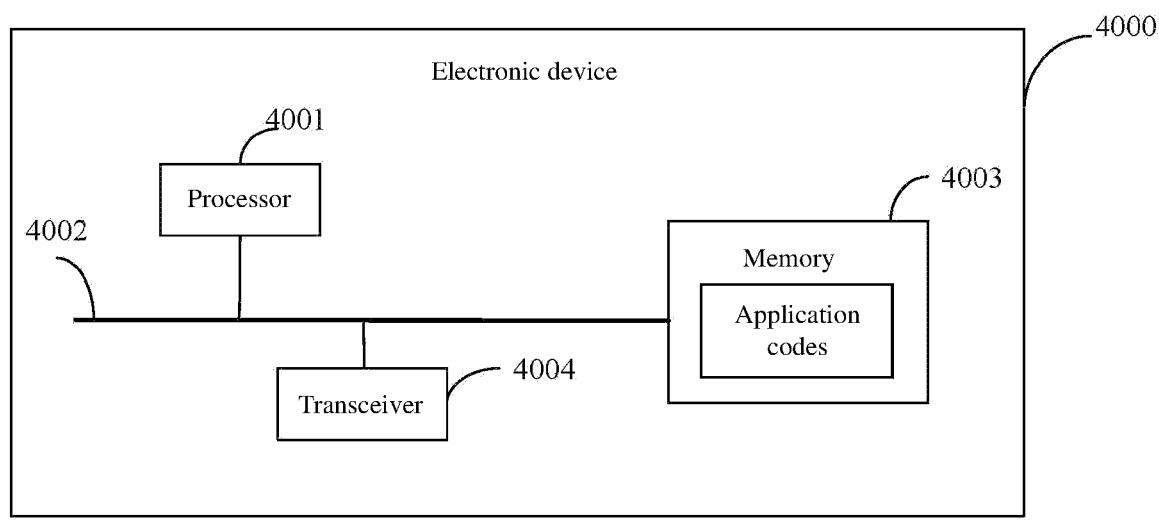
FIG. 5 is a schematic structure diagram of an electronic device according to an embodiment of the present disclosure.

An embodiment of the present disclosure further provides an electronic device. The schematic structure diagram of the electronic device is shown in FIG. 5. The electronic device 4000 shown in FIG. 5 includes a processor 4001 and a memory 4003. The processor 4001 is connected to the memory 4003, for example, through a bus 4002. Optionally, the electronic device 4000 may further include a transceiver 4004, and the transceiver 4004 may be used for data interaction between the electronic device and other electronic devices, for example, data transmission and/or data reception. It should be noted that, in practical applications, the number of the transceivers 4004 is not limited to one, and the structure of the electronic device 4000 does not constitute any limitations to the embodiments of the present disclosure.

The processor 4001 may be a central processing unit (CPU), a general-purpose processor, a digital signal processor (DSP), an application specific integrated circuit (ASIC), or a field programmable gate array (FPGA), or other programmable logic devices, transistor logic devices, hardware components, or any combination thereof. It may implement or execute various exemplary logical blocks, modules and circuits described in connection with the present disclosure. The processor 4001 may also be a combination for realizing computing functions, for example, a combination of one or more microprocessors, a combination of a DSP and a microprocessor, etc.

The bus 4002 may include a path to transfer information between the components described above. The bus 4002 may be a peripheral component interconnect (PCI) bus, or an extended industry standard architecture (EISA) bus, etc. The bus 4002 may be an address bus, a data bus, a control bus, etc. For ease of presentation, the bus is represented by only one thick line in FIG. 5. However, it does not mean that there is only one bus or one type of buses.

The memory 4003 may be, but is not limited to, read only memories (ROMs) or other types of static storage devices that can store static information and instructions, random access memories (RAMs) or other types of dynamic storage devices that can store information and instructions, may be electrically erasable programmable read only memories (EEPROMs), compact disc read only memories (CD-ROMs) or other optical disk storages, optical disc storages (including compact discs, laser discs, discs, digital versatile discs, blu-ray discs, etc.), magnetic storage media or other magnetic storage devices, or any other media that can carry or store desired programs and that can be accessed by computers.

The memory 4003 is used to store application programs for executing the embodiments of the present disclosure, and is controlled by the processor 4001. The processor 4001 is used to execute the application programs stored in the memory 4003 to implement the steps of the foregoing method embodiments.

The electronic device includes, but is not limited to, a server and the like.

This embodiment of the present disclosure at least has the following beneficial effects.

A plurality of macroblocks of an image are acquired; the sub-region(s) of each one of the plurality of macroblocks and the partition color of each macroblock are determined;

a data compression format corresponding to each macroblock is determined according to pixels in the sub-region(s) of each macroblock and the partition color of each macroblock; and each macroblock is compressed based on the data compression format corresponding to each macroblock, and the compressed data corresponding to each macroblock is determined. In this way, while ensuring the image compression efficiency, the image compression format is simplified, the image compression accuracy is guaranteed, and the over drive distortion caused by image compression is reduced.

Embodiments of the present disclosure provide a computer-readable storage medium having computer programs stored thereon that, when executed by a processor, implements steps and corresponding contents of the foregoing method embodiments.

Embodiments of the present disclosure further provide a computer program product including a computer program that, when executed by a processor, implements steps and corresponding contents of the foregoing method embodiments.

Based on the same principles as the methods according to the embodiments of the present disclosure, the embodiments of the present disclosure further provide a computer program product or computer programs. The computer program product or computer programs include computer instructions that are stored in a computer-readable storage medium. The processor of the computer device reads the computer instructions from the computer-readable storage medium, and the processor executes the computer instructions so that the computer device executes the method according to any of the optional embodiments of the present disclosure.

It should be understood that although the steps in the flowchart of the embodiments of the present disclosure are sequentially indicated by the arrows, these steps are not necessarily performed in the order indicated by the arrows. Unless explicitly stated herein, in some implementation scenarios of the embodiments of the present disclosure, the steps in the flowcharts may be executed in other sequences as required. In addition, based on actual implementation scenarios, some or all of the steps in the flowcharts may include multiple sub-steps or multiple stages. Some or all of the sub-steps or stages may be executed at the same moment of time, and each of the sub-steps or stages may be executed at different moments of time. In scenarios with different execution times, the execution order of these sub-steps or stages may be flexibly configured according to requirements, which is not limited in the embodiments of the present disclosure.

The foregoing descriptions are merely some implementations of the present disclosure. It should be noted that, to a person of ordinary skill in the art, without departing from the technical concept of the solutions of the present disclosure, the use of other similar implementation means based on the technical concept of the present disclosure also falls within the protection scope of the embodiments of the present disclosure.

What is claimed is:

1. An image compression apparatus, comprising a processor:
wherein the processor is configured to perform the following operations:
acquiring a plurality of macroblocks of an image;
determining sub-region(s) of each one of the plurality of macroblocks and a partition color of each macroblock;
determining a data compression format corresponding to each macroblock according to pixels in the sub-region(s) of each macroblock and the partition color of each macroblock; and
compressing each macroblock based on the data compression format corresponding to each macroblock, and determining the compressed data corresponding to each macroblock,
wherein the operation of determining sub-region(s) of each one of the plurality of macroblocks and a partition color of each macroblock, comprises at least one of the following:
if a sub-region of each macroblock is a texture region, determining two partition colors of the sub-region according to pixel values corresponding to the pixels in the sub-region; and
if a sub-region of each macroblock is a flat region, determining a partition color mean value corresponding to one partition color of the sub-region according to a pixel mean value corresponding to all pixels in the sub-region.

2. The apparatus according to claim 1, wherein the operation of determining sub-region(s) of each one of the plurality of macroblocks and a partition color of each macroblock, comprises:
dividing each one of the plurality of macroblocks is-into at least one sub-region, each one of the at least one sub-region being a texture region or a flat region.

3. The apparatus according to claim 1, wherein the operation of determining a data compression format corresponding to each macroblock according to pixels in the sub-region(s) of each macroblock and the partition color of each macroblock, comprises at least one of the following:
if a sub-region of each macroblock is a texture region, determining a quantized weight index for pixels in the sub-region of each macroblock according to the pixels in the sub-region of each macroblock and the partition color of the sub-region of each macroblock; and determining a data compression format corresponding to each macroblock according to the pixels in the sub-region of each macroblock, the partition color of the sub-region of each macroblock and the quantized weight index for pixels in the sub-region of each macroblock; and
if a sub-region of each macroblock is a flat region, determining a data compression format corresponding to each macroblock according to the pixels in the sub-region of each macroblock and the partition color mean value corresponding to one partition color of the sub-region of each macroblock.

4. The apparatus according to claim 3, wherein the operation of determining a data compression format corresponding to each macroblock according to pixels in the sub-region(s) of each macroblock and the partition color of each macroblock, comprises:
quantifying the partition color of the sub-region of each macroblock to obtain a plurality of color values; and
for a pixel in the sub-region of each macroblock, determining respective distances between each one of the plurality of color values and the pixel, and determining the index number of a color value corresponding to the smallest distance among the respective distances as the quantized weight index of the pixel.

5. The apparatus according to claim 1, wherein information in the data compression format corresponding to each macroblock comprises at least one of the compression format flag, the flat region flag, the partition map for each pixel in the sub-region of each macroblock, the partition color of the sub-region of each macroblock, the quantized weight index for pixels in the sub-region(s) of each macroblock, and the partition color mean value corresponding to one partition color of the sub-region of each macroblock.

6. An image compression method, comprising:
acquiring a plurality of macroblocks of an image;
determining sub-region(s) of each one of the plurality of macroblocks and a partition color of each macroblock;
determining a data compression format corresponding to each macroblock according to pixels in the sub-region(s) of each macroblock and the partition color of each macroblock; and
compressing each macroblock based on the data compression format corresponding to each macroblock, and determining the compressed data corresponding to each macroblock,
wherein determining the partition color of each macroblock comprises at least one of the following:
if a sub-region of each macroblock is a texture region, determining two partition colors of the sub-region according to pixel values corresponding to the pixels in the sub-region; and
if a sub-region of each macroblock is a flat region, determining a partition color mean value corresponding to one partition color of the sub-region according to a pixel mean value corresponding to all pixels in the sub-region.

7. The method according to claim 6, wherein determining the sub-region(s) of each one of the plurality of macroblocks comprises:
dividing each one of the plurality of macroblocks into at least one sub-region, each one of the at least one sub-region being a texture region or a flat region.

8. The method according to claim 6, wherein determining a data compression format corresponding to each macroblock according to pixels in the sub-region(s) of each macroblock and the partition color of each macroblock comprises at least one of the following:
if a sub-region of each macroblock is a texture region, determining a quantized weight index for pixels in the sub-region of each macroblock according to the pixels in the sub-region of each macroblock and the partition color of the sub-region of each macroblock; and determining a data compression format corresponding to each macroblock according to the pixels in the sub-region of each macroblock, the partition color of the sub-region of each macroblock and the quantized weight index for pixels in the sub-region of each macroblock; and if a sub-region of each macroblock is a flat region, determining a data compression format corresponding to each macroblock according to the pixels in the sub-region of each macroblock and the partition color mean value corresponding to one partition color of the sub-region of each macroblock.

9. The method according to claim 8, wherein determining a quantized weight index for pixels in the sub-region of each macroblock according to the pixels in the sub-region of each macroblock and the partition color of the sub-region of each macroblock comprises:
quantizing the partition color of the sub-region of each macroblock to obtain a plurality of color values; and
for a pixel in the sub-region of each macroblock, determining respective distances between each one of the plurality of color values and the pixel, and determining the index number of a color value corresponding to the smallest distance among the respective distances as the quantized weight index of the pixel.

10. The method according to claim 6, wherein information in the data compression format corresponding to each macroblock comprises at least one of the compression format flag, the flat region flag, the partition map for each pixel in the sub-region of each macroblock, the partition color of the sub-region of each macroblock, the quantized weight index for pixels in the sub-region(s) of each macroblock, and the partition color mean value corresponding to one partition color of the sub-region of each macroblock.

11. A non-transitory computer-readable storage medium having computer programs stored thereon that, when executed by a processor, causes the processor to implement the method according to claim 6.

* * * * *